Aug. 22, 1950  C. W. SINCLAIR  2,519,937
RIM
Filed Dec. 19, 1946  2 Sheets-Sheet 2
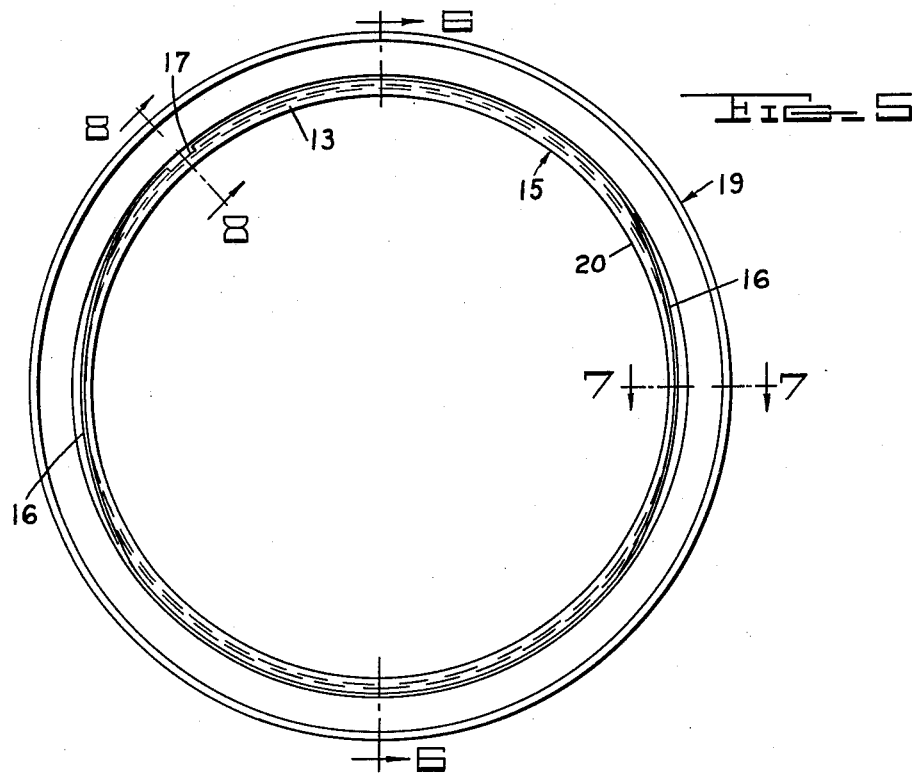
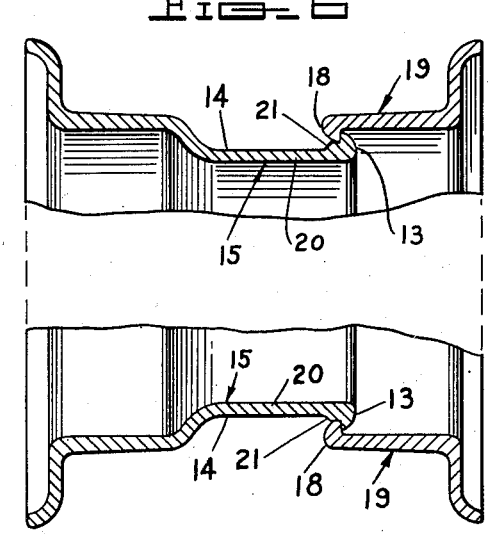
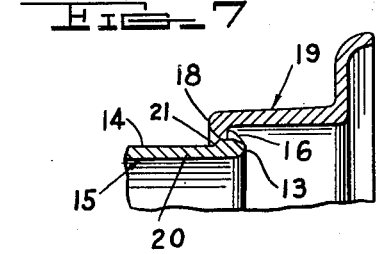
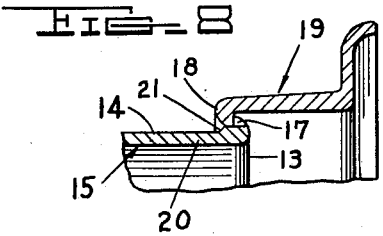
INVENTOR
Charles W. Sinclair
BY
Whittemore Hulbert & Belknap
ATTORNEYS Patented Aug. 22, 1950

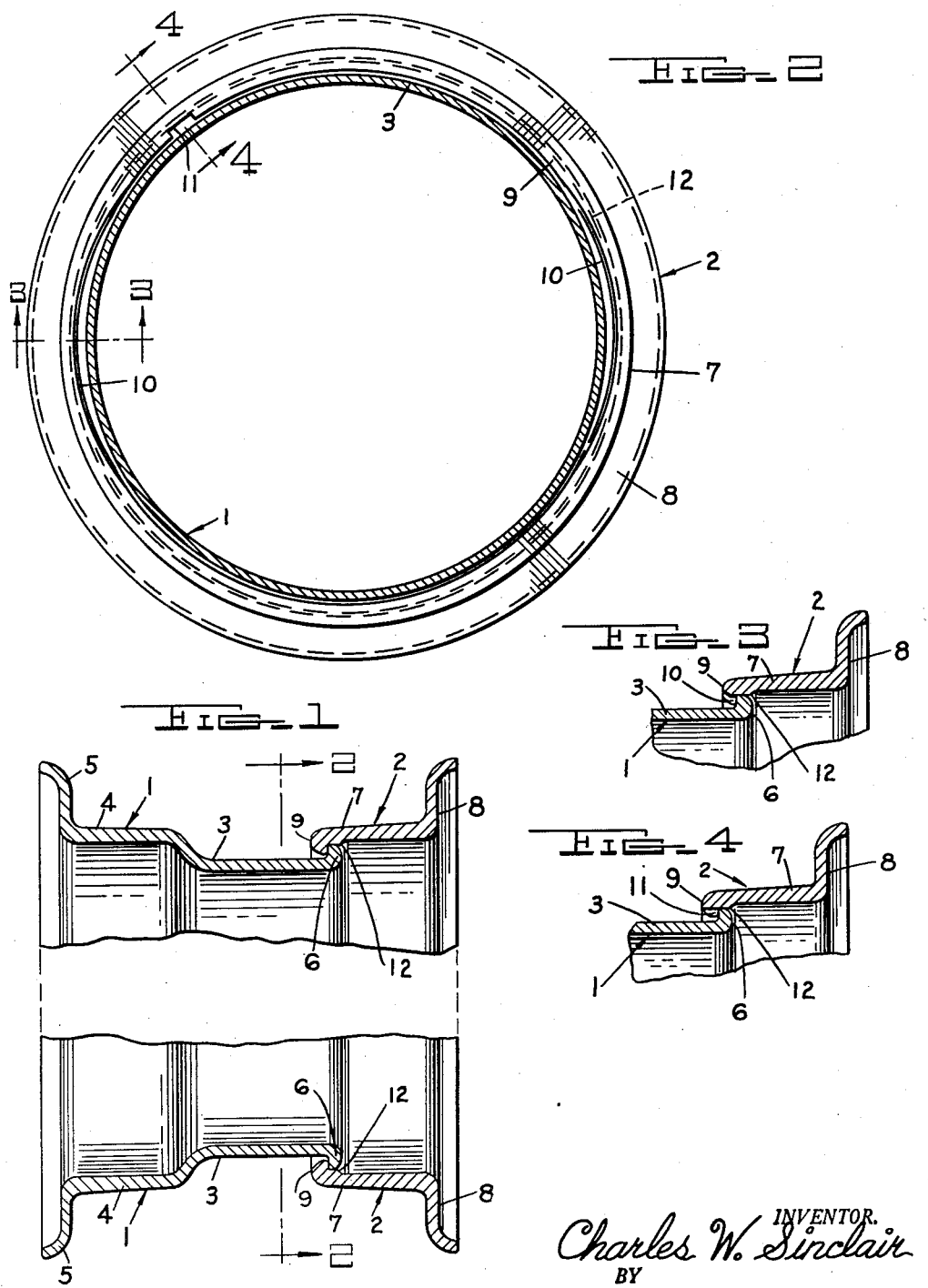

2,519,937

UNITED STATES PATENT OFFICE 2,519,937

RIM

Charles W. Sinclair, Detroit, Mich., assignor to Kelsey-Hayes Wheel Company, Detroit, Mich., a corporation of Delaware Application December 19, 1946, Serial No. 717,184

5 Claims. (Cl. 152—405)

The invention relates to rims and refers more particularly to motor vehicle tire carrying rims of the divided type.

The invention has for one of its objects to provide an improved rim in which the endless members forming the rim are radially stressed and positively held from relative radial movement so that they cannot squeak or make any other objectionable noise.

The invention has for another object to provide an improved rim in which the endless members are provided with endless circular contact portions with one around and in tight engagement with the other to positively hold the members from relative radial movement.

The invention has for a further object to so construct the rim that some of the axial pressure exerted by the tire is converted into radial pressure so that the rim members are effectively secured to each other and may be made of smaller section and decreased weight.

These and other objects of the invention will become apparent from the following description and drawings, in which Figure 1 is a diametrical section of a rim embodying the invention;

Figure 2 is a cross-section on the line 2—2 of Figure 1;

Figures 3 and 4 are cross sections on the lines 3—3 and 4—4 of Figure 2;

Figure 5 is a side view of a modified construction of rim embodying the invention;

Figures 6, 7 and 8 are cross sections on the lines 6—6, 7—7 and 8—8 of Figure 5.

As illustrated in Figures 1, 2, 3 and 4, the rim comprises the endless base member 1 which is secured to the wheel body and the endless tire retaining member 2 which is detachably secured to the base member.

The base member has the radially outwardly opening channel 3 in the nature of a shallow well, the flared tire bead seat 4, and the annular tire retaining flange 5. The portions forming the well and bead seat together form the base of the base member and the portion forming the bead seat is between the well and tire retaining flange which latter extends generally radially outwardly from the bead seat forming portion. The bead seat forming portion is preferably fixedly secured to the wheel body. The well forming portion has the annular generally radially outwardly extending outer side wall 6 with its external diameter smaller than that of the other side wall of the well forming portion.

The tire retaining member 2 has the flared tire bead seat 7 corresponding to the bead seat 4, the annular tire retaining flange 8 extending generally radially outwardly from the portion forming the bead seat 7 and the annular wall 9 extending generally radially inwardly from the portion forming the bead seat 7 and at the edge opposite the tire retaining flange 8. The internal diameter of the wall 9 is less than the distance from the bottom of the well to the diametrically opposite part of the free edge or radially outer peripheral face of the outer side wall 6 of the well.

To provide for assembly and disassembly of the rim members, the wall 9 of the tire retaining member has an interrupted free edge or radially inner peripheral face which may be forced over the wall 6 of the base member having an endless circular free edge or radially outer peripheral face. More particularly, the wall 9 is provided in its free edge with the diametrically opposite clearance spaces 10 and the notch 11 for receiving a suitable prying tool. During assembly and disassembly the tire retaining member is distorted while successive portions of the wall 9 are forced over the wall 6.

For the purpose of positively holding the base and tire retaining members from relative radial movement when in operative position so that they cannot squeak or make other objectionable noise, I have formed upon the radially inner face of the portion of the tire retaining member forming the bead seat 7 and adjacent the wall 9, the endless circular wedging projection 12 engaging the free edge of the outer side wall 6 of the well and having its smallest diameter smaller than the external diameter of the outer side wall. With this construction, the rim members may be assembled and disassembled and when the rim members are in assembled relation they have endless circular contact portions in tight engagement with each other placing the rim members under radial stress and positively holding the contacting faces of their walls from relative movement. Also, some of the axial pressure exerted by the inflated tire on the rim is converted into radial pressure and thereby more effectively secures the rim members to each other so that they may be made of smaller section and decreased weight.

In the modification illustrated in Figures 5, 6, 7 and 8, the outer side wall 13 of the well 14 of the endless base member 15 has its free edge or radially outer peripheral face interrupted by the diametrically opposite clearance spaces 16 and the notch 17 for receiving a suitable prying tool. The wall 18 of the endless tire retaining member 19 has an endless circular free edge or radially inner peripheral face.

To positively hold the base and tire retaining members from relative radial movement when in operative position, the bottom wall 20 of the well is formed with the endless circular wedging projection 21 tightly engaging the endless circular free edge of the wall 18. With this construction the rim members may be assembled and disassembled and at the same time they are positively held from relative movement when in assembled relation so that they cannot squeak or make other objectionable noise.

What I claim as my invention is:

1. A tire carrying rim comprising an endless base member having a radially outwardly opening well forming portion terminating in a generally radially outwardly extending side wall having an endless free edge, a bead seat forming portion connecting into said well forming portion and an annular generally radially outwardly extending tire retaining flange connecting into said bead seat forming portion, and an endless tire retaining member having a bead seat forming portion, an annular generally radially outwardly extending tire retaining flange at one edge of said last mentioned bead seat forming portion and an annular generally radially inwardly extending wall at the other edge of said last mentioned bead seat forming portion and located within said well and provided with a clearance recess in its free edge, said last mentioned bead seat forming portion having adjacent said last mentioned wall an endless portion in radial wedging engagement with said endless free edge of said first mentioned wall and radially stressing said members and fixedly holding the same from relative radial rubbing movement.

2. A tire carrying rim comprising an endless base member provided with an annular generally radially outwardly extending wall at one edge thereof, an endless tire retaining member extending over said base member and provided with an annular generally radially inwardly extending wall at one edge thereof abutting the laterally inner side of said first mentioned wall, the wall of one of said members having an endless free edge and the wall of the other of said members having a recessed free edge, and endless means on said other of said members in radial wedging engagement with said endless free edge of the wall of said one of said members and fixedly holding the same from relative radial rubbing movement.

3. A tire carrying rim comprising an endless base member having a base provided with a radially outwardly opening channel terminating in an annular generally radially outwardly extending side wall, an endless tire retaining member extending over said base and having an annular generally radially inwardly extending wall at one edge thereof within said channel, the wall of one of said members having an endless free edge providing a radially facing surface and the wall of the other of said members having a free edge provided with a clearance space and endless means on said other of said members providing a radially facing surface opposed to and engaging said surface of said endless free edge of the wall of said one of said members, the radially outer of said surfaces having an internal diameter smaller than the external diameter of the radially inner of said surfaces whereby said members are radially stressed and fixedly held from from relative radial rubbing movement.

4. A tire carrying rim comprising an endless base member having a base provided with a radially outwardly opening well terminating in an annular generally radial outwardly extending side wall having an endless circular free edge, an endless tire retaining member extending over said base member and having an annular generally radially inwardly extending wall at one edge within said well provided with a clearance space in its free edge and also having an endless circular portion engaging said endless circular free edge of said first mentioned wall, the internal diameter of the part of said circular portion engaging said circular free edge being smaller than the external diameter of the part of said free edge engaged by said circular portion part whereby said members are radially stressed and said engaged parts are fixedly held from relative radial rubbing movement.

5. A tire carrying rim comprising an endless base member having a base provided with a radially outwardly opening well terminating in an annular generally radially outwardly extending side wall having clearance spaces in its free edge, and an endless tire retaining member extending over said base member and having an annular generally radially inwardly extending wall at one edge thereof within said well provided with an endless circular free edge, the bottom wall of said well being provided with an endless circular portion in radial wedging engagement with said endless circular free edge of said second mentioned wall and radially stressing said members and fixedly holding the same from relative radial rubbing movement.

CHARLES W. SINCLAIR.

REFERENCES CITED

The following references are of record in the file of this patent:

UNITED STATES PATENTS

| Number | Name | Date |
|---|---|---|
| 1,640,844 | Main | Aug. 30, 1927 |
| 1,710,614 | Furrer | Apr. 23, 1929 |
| 2,324,994 | Hale | July 20, 1943 |

FOREIGN PATENTS

| Number | Country | Date |
|---|---|---|
| 626,213 | France | 1927 |